United States Patent
Tasaki et al.

(10) Patent No.: US 8,685,117 B2
(45) Date of Patent: Apr. 1, 2014

(54) LITHIUM METAL FOIL FOR BATTERY OR CAPACITOR

(75) Inventors: Shinichi Tasaki, Tokyo (JP); Mitsuru Nagai, Tokyo (JP); Nobuo Ando, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 965 days.

(21) Appl. No.: 12/096,352

(22) PCT Filed: Dec. 12, 2006

(86) PCT No.: PCT/JP2006/324767
§ 371 (c)(1),
(2), (4) Date: Jun. 5, 2008

(87) PCT Pub. No.: WO2007/072713
PCT Pub. Date: Jun. 28, 2007

(65) Prior Publication Data
US 2009/0246626 A1    Oct. 1, 2009

(30) Foreign Application Priority Data
Dec. 22, 2005    (JP) ................. 2005-370698

(51) Int. Cl.
H01M 10/16    (2006.01)
H01G 9/042    (2006.01)

(52) U.S. Cl.
USPC ........................... 29/623.1; 29/25.03

(58) Field of Classification Search
USPC ............. 429/208; 361/505; 29/623.1, 25.03
See application file for complete search history.

(56) References Cited

U.S. PATENT DOCUMENTS

| | | | |
|---|---|---|---|
| 6,461,769 B1 * | 10/2002 | Ando et al. | 429/231.95 |
| 7,697,264 B2 * | 4/2010 | Tasaki et al. | 361/502 |
| 2004/0048151 A1 * | 3/2004 | Hayashi et al. | 429/162 |
| 2007/0002524 A1 * | 1/2007 | Ando et al. | 361/503 |

FOREIGN PATENT DOCUMENTS

| | | | |
|---|---|---|---|
| EP | 1 400 996 A1 | 3/2004 | |
| EP | 1577914 A1 | 9/2005 | |
| JP | 2-211970 A | 8/1990 | |
| JP | 5-290886 | 11/1993 | |
| JP | 8-107048 | 4/1996 | |
| JP | 8-250113 A | 9/1996 | |
| JP | 9-231962 | 9/1997 | |
| JP | 10-302839 | * 11/1998 | ............ H01M 10/40 |
| JP | 2003-123758 | 4/2003 | |
| JP | 2006-216451 | 8/2006 | |
| JP | 2006-286414 | 10/2006 | |
| JP | 2006-351489 | 12/2006 | |
| WO | 98/33227 A1 | 7/1998 | |
| WO | 2004/059672 | 7/2004 | |

(Continued)

OTHER PUBLICATIONS

International Seaerch Report (English & Japanese) for PCT/JP2006/324767 mailed Mar. 27, 2007 (9 pages).

(Continued)

*Primary Examiner* — Ula C Ruddock
*Assistant Examiner* — Frank Chernow
(74) *Attorney, Agent, or Firm* — Osha Liang LLP

(57) ABSTRACT

A lithium ion capacitor includes, as a lithium ion supply source, a lithium metal foil for batteries or capacitors. A current collector 4 and a separator 3 formed of a paper or resin nonwoven fabric are preliminarily pressure-bonded and integrated to opposite surfaces of a lithium metal foil 1 for batteries or capacitors.

5 Claims, 3 Drawing Sheets

(56) References Cited

FOREIGN PATENT DOCUMENTS

WO 2004/097867 A2 11/2004
WO 2005/031773 4/2005

OTHER PUBLICATIONS

Written Opinion of ISA (Japanese) mailed Mar. 27, 2007 (5 pages).
Concise Explanation of Relevance of JP 02-211970 (1 page).
Concise Explanation of Relevance of JP 08-250113 (1 page).
Notification of Transmittal of Translation of the International Preliminary Report on Patentability (Chapter I or Chapter II of the Patent Cooperation Treaty) for International Application No. PCT/JP2006/324767, mailed on Jul. 3, 2008 (7 pages).
Extended Search Report for European Application No. 06834522.2 mailed Aug. 18, 2011 (7 pages).

* cited by examiner

LITHIUM METAL FOIL FOR BATTERY OR CAPACITOR

TECHNICAL FIELD

The present invention relates to a lithium metal foil for batteries or capacitors and a lithium ion capacitor or a lithium ion battery using the same.

BACKGROUND ART

In recent years, as an electrical storage device to be used for such an application which requires a high energy density and high power characteristics, attention has been paid to an electrical storage device called a hybrid capacitor, in which the storage principles of a lithium ion secondary battery and an electric double layer capacitor are combined with each other. As one example, an organic electrolyte capacitor has been proposed in which a carbon material capable of absorbing and desorbing lithium ions is preliminarily absorbed and supported (hereinafter, sometimes referred to as doped) with lithium ions by an electrochemical method to lower the negative electrode potential, thereby greatly increasing an energy density (for example, see Patent Document 1).

Such an organic electrolyte capacitor is expected to have a high performance, but has drawbacks such that when the negative electrode is preliminarily doped with lithium ions, the doping requires a very long time, and it is difficult to uniformly dope the entire negative electrode with lithium ions. Particularly, in a large-size, large capacity cell such as a column shape capacitor having electrodes wound or a square capacitor having a plurality of electrodes laminated, it is difficult to be put into practical use.

To solve such problems, an organic electrolyte battery has been proposed in which each of a positive electrode current collector and a negative electrode current collector has through holes penetrating from the front surface to the back surface, a negative electrode active material is capable of reversibly doping lithium ions, and the negative electrode is doped with lithium ions by electrochemical contact with a lithium metal disposed to face the negative electrode or the positive electrode (for example, see Patent Document 2).

In the organic electrolyte battery in which the electrode current collector has through holes penetrating from the front surface to the back surface, lithium ions can move from the front surface to the back surface of the electrode without being blocked by the electrode current collector. Thus, even in an electrical storage device having a cell structure with a number of electrodes laminated, it is possible to dope, via the through holes, not only a negative electrode disposed in the vicinity of the lithium metal but also a negative electrode disposed distant from the lithium metal with lithium ions by an electrochemical method.

Patent Document 1: JP-A-8-107048 (page 2, second column, lines 38 to 47)
Patent Document 2: International Publication WO 98/033227 (page 11, line 4 to page 12, line 27)

In the above-mentioned capacitor or battery, as a lithium ion supply source for absorbing or supporting (doping) of lithium ions to the negative electrode, a lithium metal foil is mainly used. It is known to use the lithium metal foil with pressure bonding the lithium metal foil to a porous current collector; however, in the related art, upon assembly of the capacitor or the battery, the lithium metal foil is cut into a predetermined size by a metal cutting blade, each cut foil is pressure-bonded to the current collector, and the pressure-bonded cut foils are disposed on an electrode laminate unit in which an electrode layer (positive and negative electrodes) is laminated or wound, thereby assembling the capacitor or the battery.

However, when the lithium metal foil is cut by the metal cutting blade, the lithium metal adheres to the cutting blade, complicating the cutting operation and thus making it difficult to cut in a precise and smooth manner. For this reason, in the past, it has been deliberated to apply an electrolytic solution to the cutting blade or using the cutting blade of a resin material. However, even such deliberation could not avoid lowering of the productivity and is not industrially satisfactory.

In addition, since the lithium metal foil is likely to deform when formed into a thin metal foil having a thickness of about 10 to about 500 µm, for example, it provides poor handling properties upon assembly of the capacitor or battery during or after cutting, thereby deteriorating workability and causing misalignment of the electrodes, which eventually cause deterioration in the quality.

DISCLOSURE OF THE INVENTION

The present invention has been made to solve such problems, and its object is to provide a highly productive lithium metal foil which can provide easy cutting properties and good handling properties, thereby enabling easy assembly of a capacitor or a battery.

To achieve the above object, the present inventors have conducted extensive studies on the lithium metal foil, which is a lithium ion supply source, and as a result, found that when the lithium metal foil is formed to have a laminated structure by preliminarily attaching a paper or resin nonwoven fabric into the lithium metal foil, it is possible to provide a lithium metal foil having easy cutting properties and good handling properties, and accomplished the present invention. That is, at least one example of the present invention provides a lithium metal foil for batteries or capacitors and a lithium ion capacitor or battery using the same, as follows.

(1) A lithium metal foil for batteries or capacitors,
wherein a support member is attached to a single surface or both surfaces of the lithium metal foil.
(2) The lithium metal foil for batteries or capacitors according to (1),
wherein the support member is a separator, a current collector or a backing material.
(3) The lithium metal foil for batteries or capacitors according to (2),
wherein the separator and the current collector are porous materials having through holes.
(4) The lithium metal foil for batteries or capacitors according to (3),
wherein the separator is pressure-bonded to one surface of the lithium metal foil, and
wherein the current collector is pressure-bonded to the other surface.
(5) The lithium metal foil for batteries or capacitors according to (2), (3) or (4),
wherein the separator is a paper or resin nonwoven fabric, and
wherein the paper or resin nonwoven fabric is attached with the lithium metal foil by pressure bonding.
(6) The lithium metal foil for batteries or capacitors according to any one of (1) to (5),
wherein the lithium metal foil has a thickness of 5 to 500 µm.
(7) The lithium metal foil for batteries or capacitors according to any one of (1) to (6),
wherein the support member has a thickness of 10 to 150 µm.

(8) A lithium ion capacitor, including:
a positive electrode formed of a material capable of reversibly doping lithium ions and/or anions;
a negative electrode formed of a material capable of reversibly doping lithium ions; and
a solution of a lithium salt in an aprotic organic solvent as an electrolytic solution,
wherein the positive electrode and the negative electrode each has a current collector having a hole penetrating from the front surface to the back surface,
wherein the negative electrode and/or the positive electrode is doped with lithium ions by the electrochemical contact of the negative electrode and/or the positive electrode with a lithium ion supply source, and
wherein the potential of the positive electrode is 2.0 V or less after the positive electrode and the negative electrode are short-circuited, characterized in that the lithium metal foil according to any one of (1) to (7) is used as the lithium ion supply source.

(9) The lithium ion capacitor according to (8),
wherein a negative electrode active material has a capacitance per unit weight at least three times that of a positive electrode active material, and
wherein the weight of the positive electrode active material is larger than the weight of the negative electrode active material.

(10) A lithium ion battery,
wherein a positive electrode and a negative electrode are formed of a material capable of reversibly doping lithium ions, characterized in that
the lithium metal foil according to any one of (1) to (7) is used as a lithium ion supply source.

As used herein, the term "dope" means inclusion, support, occlusion or absorption and refers to a phenomenon that lithium ions and/or cations are included in an active material.

According to at least one example of the present invention, since the lithium metal foil and the support member are attached to each other to form a laminated structure as described above, the cutting of the lithium metal foil by a cutting blade is made easy. With this construction, the lithium metal foil can be cut into a predetermined shape in a precise and smooth manner, thereby enabling improvement in the quality of the battery or capacitor and improvement in the productivity. Further, since the handling properties of the lithium metal foil which is thin and difficult to handle is improved by attachment to the support member, it is possible to improve the workability upon assembly during and after cutting.

In addition, by appropriately selecting the separator, the current collector, or the backing material as the support member to be attached to the lithium metal foil, it is possible to preliminarily combine the materials with the lithium metal foil, thereby enabling improvement in the cutting properties and handling properties of the lithium metal foil and simplifying the assembly of the capacitor or battery and thus providing efficient workability.

Other features and advantages will become obvious or be apparent from the descriptions of the examples and the accompanying claims.

Figure 1:
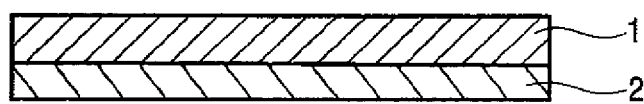
FIG. 1 is a schematic sectional view of a lithium metal foil for batteries or capacitors according to a typical example of the present invention.

DESCRIPTION OF REFERENCE NUMERALS 1, 1': LITHIUM METAL FOIL
2: SUPPORT MEMBER
3, 3': SEPARATOR
4, 4a: CURRENT COLLECTOR
5: THROUGH HOLE
6: MICRO UNEVENNESS
7: NONWOVEN FABRIC
8, 9: WINDING ROLL
10, 10': PRESSURE ROLL
11: POSITIVE ELECTRODE
11a: POSITIVE ELECTRODE CURRENT COLLECTOR
12: NEGATIVE ELECTRODE
12a: NEGATIVE ELECTRODE CURRENT COLLECTOR
13, 13': SEPARATOR
14: LITHIUM METAL (LITHIUM ION SUPPLY SOURCE)
15: OUTER CONTAINER
16: ELECTRODE LAMINATE UNIT
17: ELECTRODE WINDING UNIT
18, 19, 20: LEAD-OUT PORTION
21: POSITIVE ELECTRODE CONNECTION TERMINAL
22: NEGATIVE ELECTRODE CONNECTION TERMINAL

BEST MODE FOR CARRYING OUT THE INVENTION

Now, embodiments of the present invention will be described in detail with reference to the accompanying drawings.

FIG. 1 is a sectional view of a lithium metal foil for batteries or capacitors (hereinafter, simply referred to as a lithium metal foil) according to a typical example of the present invention. The lithium metal foil according to the typical example of the present invention has a laminated structure in which a lithium metal foil 1 is preliminarily attached to a support member 2, as shown in FIG. 1. The support member 2 can improve the cutting properties or handling properties of the lithium metal foil 1 when attached with the lithium metal foil 1 and plays an important role in the lithium metal foil of a battery or a capacitor (hereinafter, these devices will be collectively referred to as a capacitor and so forth). As the support member 2, a separator, a current collector, a backing material, and so forth are used. The separator is provided between electrodes when the lithium metal foil is arranged as a lithium ion supply source so that the lithium metal foil does not directly contact with the electrode. The current collector has a function of short-circuiting the lithium metal foil mounted on a capacitor and so forth as the lithium ion supply source to a negative electrode. The backing material has a function of shape-retaining and reinforcing the thin lithium metal foil to improve the handling properties.

As a material for the support member 2, a material having durability against an electrolytic solution of the capacitor and so forth, preferably a porous member having through holes through which lithium ions can move is used. Specifically, examples of the material for the support member 2 include a paper (cellulose) or resin nonwoven fabric (hereinafter, simply referred to as a nonwoven fabric), a microporous resin film, a porous metal foil or net. Particularly, as a separator, a nonwoven fabric having durability against an electrolytic solution, that is easily pressure-bonded to the lithium metal foil is used preferably. Known one as a separator for batteries or capacitors is preferably used. The nonwoven fabric includes a nonwoven fabric in which a cellulose and a resin is mixed, and the form is not particularly limited so long as it is a nonwoven fabric.

Figure 2:
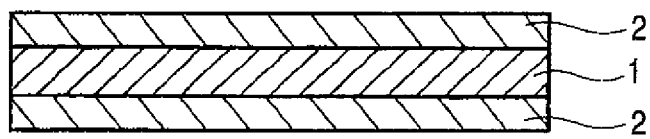
FIG. 2 is a schematic sectional view of a lithium metal foil for batteries or capacitors according to another typical example of the present invention.
Figure 3:
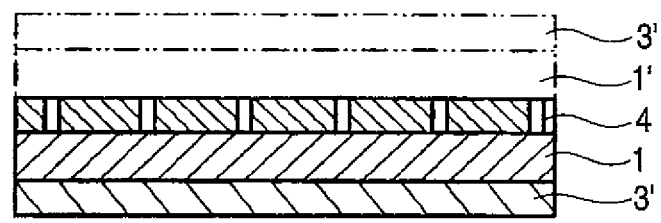
FIG. 3 is a schematic sectional view of a lithium metal foil for batteries or capacitors according to another typical example of the present invention.

As a laminated structure of the lithium metal foil 1 and the support member 2, it can have a two-layer structure in which the support member 2 is provided only on a single surface of the lithium metal foil 1, as shown in FIG. 1. Alternatively, it can have a three-layer structure in which the support members 2 are provided on both surfaces of the lithium metal foil 2, as shown in FIG. 2. When the support members 2 are provided on both surfaces of the lithium metal foil 1, although the support members 2 formed of the same material are provided on both surfaces of the lithium metal foil 1 in FIG. 2, the support members 2 formed of different materials can be provided as shown in FIG. 3. In FIG. 3, a separator 3 formed, for example, of a nonwoven fabric and a current collector 4 formed, for example, of a metallic material, having through holes 5 are pressure-bonded to the lower and upper surfaces of the lithium metal foil 1, respectively. As an application example of such a three-layer structure lithium metal foil 1, a four- or five-layer structure as denoted by the chained line in FIG. 3 is also possible in which another lithium metal foil 1' is pressure-bonded to the external surface of the current collector 4 pressure-bonded to the lithium metal foil 1 and according to the needs, another separator 3' is preliminarily attached to the external surface of the lithium metal foil 1'. When the support member is a separator, the lithium metal foil can be pressure-bonded to only a part of the separator.

Figure 4:
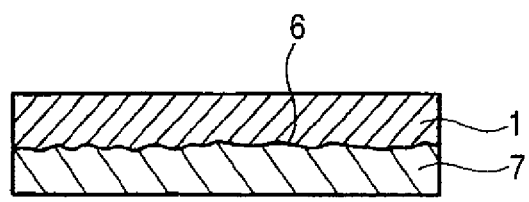
FIG. 4 is an enlarged sectional view showing an example of a pressure bonding portion of a lithium metal foil and a nonwoven fabric of the present invention.

According to the typical example of the present invention, the lithium metal foil 1 and the support member 2 are attached with each other without misalignment. As a method of the attachment, pressure-bonding or adhesive-bonding is preferable, and, particularly, the pressure-bonding is excellent in that it enables easy attachment. That is, the pressure-bonding which takes advantage of an unevenness of the surface of the support member 2 to pressure-bond the lithium metal foil 1 is effectively used when the support member 2 has a micro unevenness on the surface as with a nonwoven fabric or when the support member 2 has an unevenness on the surface caused by through holes as with a porous metal net. FIG. 4 is an enlarged sectional view schematically showing a pressure-bonding portion of the lithium metal foil 1 and a nonwoven fabric 7 having a micro unevenness 6. When the nonwoven fabric 7 is pressure-bonded to the lithium metal foil 1 in an overlapping manner, the lithium metal foil 1 is pressure-contacted and pressure-bonded to the micro unevenness 6 of the nonwoven fabric 7 as shown in the drawing, whereby the lithium metal foil 1 is attached to the nonwoven fabric 7.

Although not shown in the drawing, when the support member 2 is a porous metal net, it is possible to attach the lithium metal foil 1 to the support member 2 by pressure-bonding in a similar manner.

On the other hand, the adhesive-bonding method for attachment the lithium metal foil 1 to the support member 2 is effectively used when the support member 2 does not have sufficient unevenness as with a microporous resin film. In such a case, an adhesive is applied to a single surface of the support member and then the lithium metal foil 1 is adhesive-bonded to the applied surface in an overlapping manner. As the adhesive, an adhesive which does not give bad influence to the lithium metal foil 1, the support member 2, and so forth can be appropriately used. For example, an acrylic adhesive, a silicone adhesive, a rubber adhesive, are preferably used. An application method of the adhesive is not particularly limited and a know method such as a spraying method, a roll coating method, a brushing method, or a gravure printing method can be used. In this case, it is not necessary to adhesive-bond the lithium metal foil 1 and the support member 2 on the entire surface thereof. Instead, the adhesive can be applied in a stripe pattern or a dot pattern so that they are partially adhesive-bonded and attached.

In this way, the lithium metal foil 1 is preliminarily attached to the support member 2 by adhesive-bonding or pressure-bonding. However, in either cases, they are only required to be fixed in such a manner that the lithium metal foil 1 and the support member 2 are not misaligned when the attached lithium metal foil 1 is cut by a cutting blade or when the cut foil of the lithium metal foil 1 is placed on the capacitor and so forth. Therefore, the attachment does not require firm fixation. Since the support member 2 is preliminarily attached to the lithium metal foil 1, it is possible to cut the lithium metal foil 1 by a cutting blade from above the support member. Since the lithium metal foil 1 of the cut part is cut in a state that it is pressed by the support member from the above, it is possible to prevent the lithium metal from adhering to the cutting blade. At the same time, since the handling properties of the very thin lithium metal foil 1 are improved by the laminated structure with the support member, the workability upon cutting of the lithium metal foil 1 and upon cell assembling of the cut lithium metal foil 1 can be improved. Further, by the attached-structure with the lithium metal foil 1, it is possible to mount the separator or the current collector along with the lithium metal foil 1, thereby simplifying the assembling operation.

In the typical example of the present invention, when a lithium ion battery or capacitor is constructed such that a positive electrode and a negative electrode each has a current collector having holes penetrating from the front surface to the back surface and the negative electrode and/or the positive electrode are doped with lithium ions by electrochemical contact of the negative electrode and/or the positive electrode with a lithium ion supply source, a lithium metal foil as the lithium ion supply source preferably has a thickness of 5 to 500 μm. The thickness of the lithium metal foil is not particularly limited since the thickness is mainly determined in accordance with the amount of lithium ions doped to the battery or capacitor and the size (area) of the lithium metal foil provided as the lithium ion supply source of the battery or capacitor. When it is desired to dope a large amount of lithium ions using a lithium metal foil of which the size is fixed, a thick lithium metal foil is generally used. When the thickness of the lithium metal foil is smaller than 5 μm, doping a predetermined amount of lithium ions requires the lithium metal foil for each sheet of the negative electrode and it is thus impractical and undesirable. On the other hand, when supplying lithium ions to a negative electrode having many layers, the lithium metal foil becomes thicker than 500 μm, causing a fear that the doping of lithium ions takes much time. In consideration of the above matters, a thickness of 50 to 300 μm is more preferable as a practical thickness of the lithium metal foil.

The thickness of the support member is appropriately determined by the material or the purpose of use (for example, a separator or a current collector); a thickness of 10 to 150 μm is preferable as a practical thickness; and more preferably, a thickness of 20 to 100 μm. Particularly, this thickness range is preferable when the support member is a separator. When the separator has a thickness of less than 10 μm, it can accelerate the difficulty in producing the separator and there is a fear that it can cause a trouble in the function of the separator. When the separator has a thickness of more than 150 μm, it becomes too thick, thus preventing miniaturization of the capacitor and so forth or causing deterioration in an energy density.

Next, an example of a manufacturing method of the lithium metal foil for batteries or capacitor according to the typical example of the present invention will be described with reference to FIG. 5.

Figure 5:
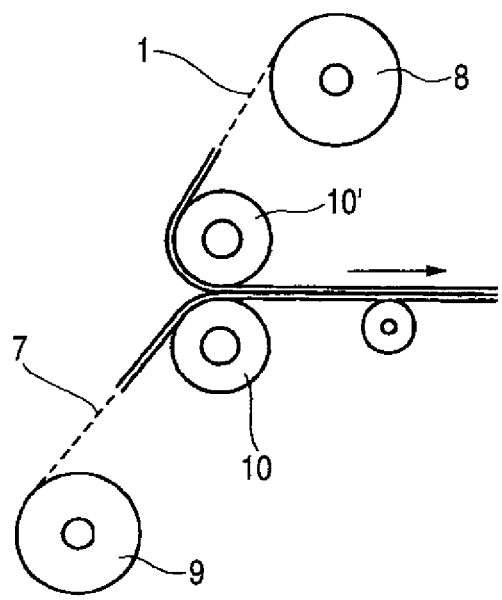
FIG. 5 is a schematic view showing an example of a fabrication method of a lithium metal foil for batteries or capacitors according to the present invention.

FIG. 5 is a schematic view when the nonwoven fabric 7, for example, is attached as the separator (support member) on a single surface of the lithium metal foil 1 by pressure-bonding. As shown in FIG. 5, the lithium metal foil 1 and the nonwoven fabric 7 to be pressure-bonded are formed in a ribbon shape and prepared as a winding roll 8 and a winding roll 9, respectively. The lithium metal foil 1 led out from the winding roll 8 and the nonwoven fabric 7 led out from the winding roll 9 are introduced between paired pressure rolls 10 and 110. The lithium metal foil 1 and the nonwoven fabric 7 introduced are pressed by the pressure rolls 10 and 10' in an overlapping state, whereby the lithium metal foil 1 is pressure-bonded to the micro uneven surface of the nonwoven fabric 7 so that they are attached to each other. As the pressure rolls 10 and 10', rolls made from Delrin™ which have a suitable hardness and elasticity are preferable since they can push and pressure-bond the thin, flexible lithium metal foil 1 to the uneven surface of the nonwoven fabric 7.

In the above method, when the nonwoven fabric 7 is replaced by a current collector, it is possible to pressure-bond and attach the lithium metal foil 1 to the surface of the current collector. When it is desired to obtain a lithium metal foil 1 in which the nonwoven fabric 7 and the current collector are pressure-bonded to the lower surface and the upper surface of the lithium metal foil 1, respectively, a ribbon-shaped current collector (not shown) is overlapped on the upper surface of the lithium metal foil 1 shown in FIG. 5 so that the lithium metal foil 1 is sandwiched between the nonwoven fabric 7 and the current collector. In such a state, when the lithium metal foil 1, the nonwoven fabric 7, and the current collector are pressed by the pressure rolls 10 and 10', it is possible to sequentially manufacture the lithium metal foil 1 having a three-layer structure. Needless to say, the nonwoven fabric 7 can be first pressure-bonded to the lower surface of the lithium metal foil 1 and then the current collector can be pressure-bonded to the upper surface of the lithium metal foil 1. In this manner, by changing the kind of the support member to be pressure-bonded to the lithium metal foil 1 and the order and the number of layers, it is possible to obtain a lithium metal foil 1 suitable to the way and purpose of use of the lithium metal foil 1.

The capacitor and so forth according to the typical example of the present invention is characterized in that a lithium metal foil obtained by being preliminarily attached to the support member as described above is used as a lithium ion supply source.

Figure 6:
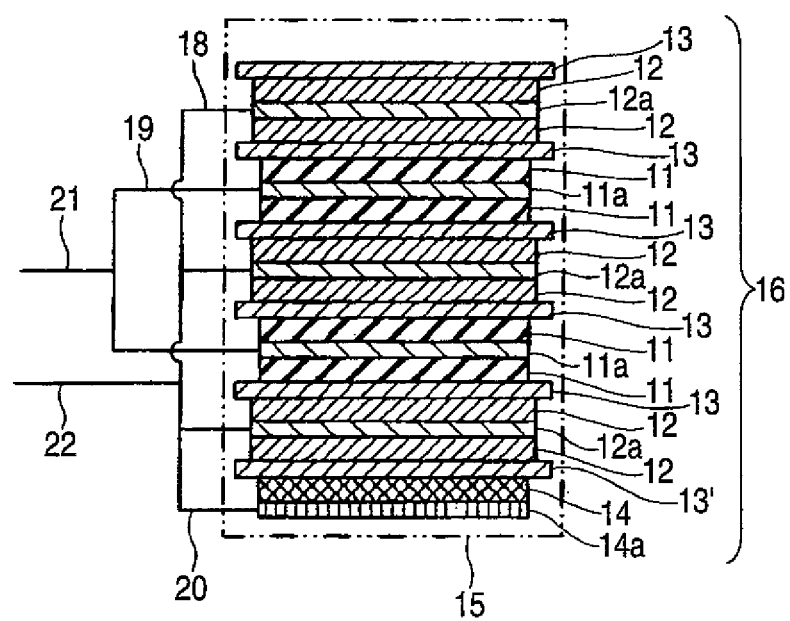
FIG. 6 is a sectional view showing an example of a square lithium ion capacitor according to the present invention.

Hereinafter, preferred embodiments of the lithium ion capacitor of the present invention will be described with reference to the drawings; however, the present invention is not limited to this. FIG. 6 shows a sectional view of a square cell as a typical example of a lithium ion capacitor (hereinafter, sometimes referred to as an LIC or a cell) according to the present invention.

In this example, as shown in FIG. 6, the cell is constructed such that negative electrodes 11 and positive electrodes 12 are alternately laminated with a separator 13 interposed therebetween to form an electrode laminate unit 16. In this case, preferably, the cell is constructed such that the negative electrode 12 is disposed at the outermost portion of the electrode laminate unit 16, a lithium metal 14 as an lithium ion source is disposed, for example, on the lower portion of the electrode laminate unit 16 so as to face the positive electrode 11 and the negative electrode 12, and they are accommodated in an outer container 15. The laminated positive electrodes 11 are connected to a positive electrode connection terminal 21 by a lead-out portion 19, and the negative electrodes 12 and the lithium metal 14 are connected to a negative electrode connection terminal 22 by a lead-out portion 18 and a lead-out portion 20, respectively. In this example, the positive electrode connection terminal 21 and the negative electrode connection terminal 22 are provided at the same side (on left side in FIG. 1) of the cell; however, the positions of the connection terminals are appropriately changeable and they can be led out from opposite sides of the cell.

Then, an electrolytic solution (electrolyte) capable of transferring lithium ions is injected in the inside of the thus-constructed cell, followed by sealing. When the cell is left for a predetermined time (10 days, for example), the lithium metal 14 and the negative electrodes 12 are short-circuited, whereby the negative electrodes 12 can be preliminarily doped with lithium ions. In the present invention, the "positive electrode" means an electrode on the side where a current flows out during discharging and a current flows in during charging, and the "negative electrode" means an electrode on the side where a current flows in during discharging and a current flows out during charging.

In this example, the cell is constructed by a total of five active material layers including two positive electrode active material layers and three negative electrode active material layers; however, the number of layers of the positive electrode and the negative electrode mounted on the cell is appropriately determined in accordance with the kind of the cell, the number of layers of the lithium metal to be disposed in the cell, and so forth. Therefore, although not specified, in square cells, usually, the number of active material layers is preferably about 10 to 20 layers. In addition, in FIG. 6, the electrode laminate unit is accommodated in the outer container 15 in the transversal direction (horizontal direction); however, the electrode laminate unit 16 can be accommodated in the outer container 15 in the longitudinal direction.

In the above-described cell, the lithium metal foil (lithium ion supply source) 14 to be disposed to the electrode laminate unit 16 is a lithium metal foil in which a separator 13' and a current collector 14a are preliminarily pressure-bonded and attached to both surfaces of the lithium metal foil. The lithium metal foil 14 is cut by a cutting blade so as to correspond to the electrode laminate unit 16, and the cut part of the lithium metal foil is disposed such that the separator side of the cut part faces the electrode laminate unit 16. In this case, since the lithium metal foil is cut in a state that the lithium metal foil is sandwiched between the separator 13' and the current collector 14a, it is possible to perform the cutting with high degree of precision while preventing the lithium metal from adhering to the cutting blade. In addition, since the lithium metal foil, which as a single body, is too thin and thus hard to handle, is made easy to handle by the attachment to the separator 13' and the current collector 14a, it is possible to improve the workability upon cutting of the lithium metal foil and upon assembly of the cut lithium metal foil. Further, since the current collector 14a and the separator 13' can be mounted along with the lithium metal 14 when the lithium metal foil is disposed to the electrode laminate unit 16, it is possible to efficiently assemble the cell. Moreover, thanks to the separator 13', it is possible to prevent the lithium metal foil 14 from directly contacting the negative electrode 12.

The positive electrodes 11 and the negative electrodes 12 constituting the electrode laminate unit 16 are preferably formed, as shown in FIG. 6, at both sides of the positive electrode current collectors 11a and the negative electrode current collectors 12a, respectively, as the positive electrode active material layers and the negative electrode active material layers on the positive electrode current collectors 11a and the negative electrode current collectors 12a, respectively (in the drawing, the positive electrode active material layers and the negative electrode active material layers are denoted by the positive electrodes 11 and the negative electrodes 12, respectively). The positive electrode current collector 11a and the negative electrode current collector 12a are formed of a porous member having holes penetrating from the front surface to the back surface. By forming the positive electrode current collector 11a and the negative electrode current collector 12a using a porous member, even when the lithium metal 14 is disposed, for example, at the outermost portion of the electrode laminate unit 16 as shown in FIG. 6, lithium ions can freely move from the lithium metal 14 through the through holes of the current collectors and between the electrodes, whereby the entire negative electrodes 12 of the electrode laminate unit 16 can be doped with lithium ions. Although not shown in the drawing, in the case of a laminated film cell, only the outer container is changed and the cell structure is substantially the same as the square cell described above.

Figure 7:
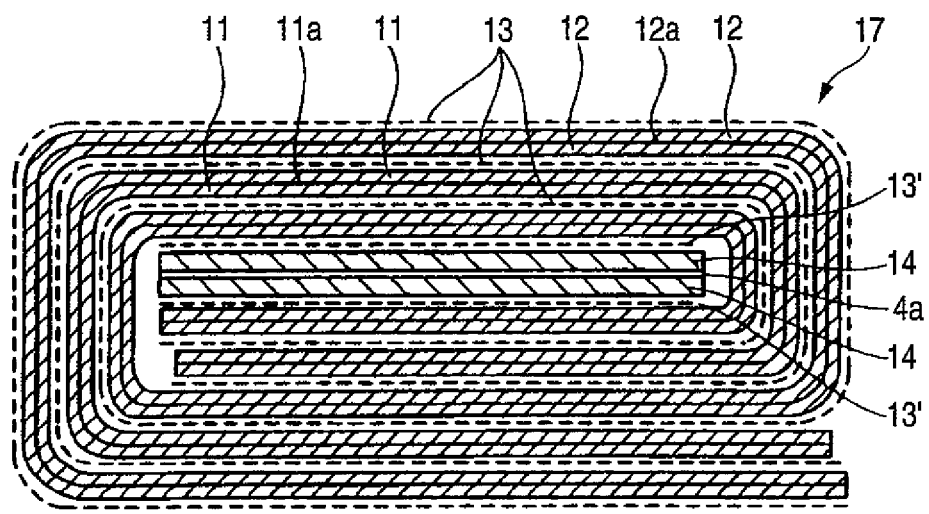
FIG. 7 is a sectional view showing an example of a wound lithium ion capacitor according to the present invention.

FIG. 7 is a sectional view of a wound type lithium ion capacitor, as another embodiment of the present invention. In this example, a ribbon-shaped positive electrode 11 and a ribbon-shaped negative electrode 12 are wound with an separator 13 interposed therebetween to form an electrode winding unit 17 having a column shape such that the separator 13 is at the outermost portion and the negative electrode 12 is at the inner side, thereby forming a cell in which a lithium metal 14 is disposed, for example, at the core portion of the electrode winding unit 17. In FIG. 7, the positive electrode 11 is formed as positive electrode active material layers on both sides of a strip-shaped positive electrode current collector 11a, and the negative electrode 12 is formed as negative electrode active material layers on both sides of a strip-shaped negative electrode current collector 12a.

As the lithium metal 14, a five-layer structure lithium metal is used in which lithium metal foils are preliminarily pressure-bonded to both sides of a porous current collector 4a, and separators 13' formed, for example, of a resin nonwoven fabric are pressure-bonded to the outer sides of the lithium metal foils so that they are attached to each other. The thus-formed lithium metal is cut by a cutting blade so as to correspond to the size of the core portion of the electrode winding unit 17. In the lithium metal 14, the current collector 4a and the separators 13' are attached such that the lithium metal foil (lithium metal 14) is sandwiched by them and they are not easily separated or misaligned. With this construction, it is possible to perform the cutting while preventing the lithium metal from adhering to the cutting blade and to assemble the cell by inserting the cut lithium metal foil, as it is, into the core portion of the electrode laminate unit 17. In addition, since they are made easy to handle by the attachment and can be combined and mounted together, the assembly is made easy and thus good workability is provided. Thanks to the separator 13' pressure-bonded to the outer sides of the lithium metal 14 inserted into the core portion of the electrode winding unit 17, it is not necessary to provide an additional separator and it is possible to prevent the lithium metal 14 from directly contacting the negative electrode 12.

In the cell structure described above, the positive electrode current collector 11a and the negative electrode current collector 12a are formed of a porous member in a similar manner to the case of the above-described laminated cell. When the lithium metal 14 is short-circuited, for example, to the negative electrode 12, lithium ions move from the lithium metal 14 disposed at the cell core portion through the holes of the current collectors whereby the negative electrode 2 of the electrode winding unit 17 is doped with a predetermined amount of lithium ions.

Although not shown in the drawing, the lithium metal can be provided at the outer peripheral portion of the electrode winding unit 17 and lithium ions can be doped such that lithium ions are moved from the outer side of the electrode winding unit 17 toward the core portion. Alternatively, the lithium metals can be disposed both at the core portion and the outer peripheral portion of the electrode winding unit 17 and lithium ions can be doped such that lithium ions are moved from the inner and outer sides of the electrode winding unit 17. In this case, the lithium metal disposed at the outer peripheral portion of the electrode winding unit 17 is preferably obtained by preliminarily pressure-bonding the separator and the current collector so as to be attached to both surfaces of the lithium metal foil in a manner similar to the lithium metal of the above-described square cell. Further, although not shown in the drawing, a lithium metal disposed to a column shape electrode winding unit obtained by winding the positive electrode and the negative electrode in a circular shape with a separator interposed therebetween has substantially the same structure.

The LIC of the present invention includes a positive electrode formed of a material capable of reversibly doping lithium ions and/or anions; a negative electrode formed of a material capable of reversibly doping lithium ions; and a solution of a lithium salt in an aprotic organic solvent as an electrolytic solution. Further, according to a preferred LIC of the present invention, the potential of the positive electrode is 2.0 V or less (vs. Li/Li$^+$) after the positive electrode and the negative electrode are short-circuited.

In a conventional electric double layer capacitor, usually the same active material (mainly an activated carbon) is used for the positive electrode and the negative electrode in substantially the same amounts. This active material has a potential of about 3 V when a cell is assembled, and when the capacitor is charged, anions form an electric double layer at the surface of the positive electrode thereby to increase the positive electrode potential, and on the other hand, cations form an electric double layer at the surface of the negative electrode thereby to decrease the potential. On the contrary, upon discharging, anions and cations, respectively from the positive electrode and the negative electrode, are released to the electrolytic solution, and the potentials respectively decrease and increase thereby to recover to about 3V. In this way, since a common carbon material has a potential of about 3 V, in an organic electrolyte capacitor using a carbon material for both the positive electrode and the negative electrode, the potentials of the positive electrode and the negative electrode are both about 3 V after the positive electrode and the negative electrode are short-circuited.

On the other hand, in a preferred LIC of the present invention, the potentials of the positive electrode and the negative electrode after the positive electrode and the negative electrode are short-circuited are 2.0 V or less (vs. $Li/Li^+$, the same applies hereinafter) as mentioned above. That is, in the present invention, an active material capable of reversibly doping lithium ions and/or anions is used for the positive electrode, an active material capable of reversibly doping lithium ions is used for the negative electrode, and the negative electrode and/or the positive electrode are preliminarily doped with lithium ions so that the potentials of the positive electrode and the negative electrode are 2.0 V or less after the positive electrode and the negative electrode are short-circuited. In the present invention, the preliminary doping of lithium ions means doping by supplying lithium ions from a lithium ion supply source such as a lithium metal other than the positive electrode and the negative electrode.

In the present invention, the potential of the positive electrode being 2.0 V or less after the positive electrode and the negative electrode are short-circuited means a potential of the positive electrode being 2.0 V or less as measured by either of the following two methods (A) and (B). That is, the potential of the positive electrode is 2.0 V or less (A) after doping with lithium ions, a positive electrode terminal and a negative electrode terminal of a capacitor cell are directly connected by a conducting wire and the capacitor cell is left to stand for at least 12 hours in such a state, and then the short-circuit is released, and the positive electrode potential is measured within 0.5 to 1.5 hours, or (B) after discharging to 0 V at a constant current over a period of at least 12 hours by a charge and discharge testing apparatus, and the positive electrode potential is measured within 0.5 to 1.5 hours.

Further, in the present invention, the positive electrode potential being 2.0 V or less after the positive electrode and the negative electrode are short-circuited is not limited only to the potential immediately after doping with lithium ions, but also means a positive electrode potential being at most 2.0 V after short-circuit in any state, i.e., short-circuit in a charged state, in a discharged state or after repeated charge and discharge.

In the present invention, the positive electrode potential being 2.0 V or less after the positive electrode and the negative electrode are short-circuited will be described in detail below. As described above, an activated carbon or a carbon material usually has a potential at a level of about 3 V (vs. $Li/Li^+$). In a case where an activated carbon is used for both the positive electrode and the negative electrode to assemble a cell, since both potentials are about 3 V, the positive electrode potential will be unchanged at about 3 V even when the electrodes are short-circuited. Further, also in the case of a hybrid capacitor using an activated carbon for the positive electrode and using for the negative electrode a carbon material such as graphite or hard carbon to be used for a lithium ion secondary battery, since both the potentials are about 3 V, the positive electrode potential will be unchanged and about 3 V even when the electrodes are short-circuited. The negative electrode potential will move to the vicinity of 0 V by charge although it depends on the balance of positive electrode and negative electrode weights, and it is therefore possible to increase the charging voltage, whereby a capacitor having a high voltage and a high energy density will be obtained. In general, the upper limit of the charging voltage is determined to be a voltage at which no decomposition of the electrolytic solution by an increase of the positive electrode potential will occur. Thus, when the positive electrode potential is at the upper limit, it is possible to increase the charging voltage correspondingly to a decrease of the negative electrode potential.

However, in the above-described hybrid capacitor of which the positive electrode potential is about 3 V at the time of short-circuit, if the upper limit potential of the positive electrode is 4.0 V for example, the positive electrode potential at the time of discharge is limited to 3.0 V, and the change in the potential of the positive electrode is at 1.0 V and the capacity of the positive electrode can not sufficiently be utilized. Further, it has been known that when lithium ions are doped into (charge) and dedoped from (discharge) the negative electrode, the initial charge and discharge efficiency is low in many cases, and some lithium ions can not be released at the time of discharging. This is explained to be because the lithium ions are consumed for decomposition of the electrolytic solution at the surface of the negative electrode or they are trapped in structural defect portions of the carbon material. In such a case, the charge and discharge efficiency of the negative electrode is low as compared with the charge and discharge efficiency of the positive electrode, and thus the positive electrode potential will be higher than 3 V when the cell is short-circuited after charging and discharging are repeatedly carried out, and the utilization of the capacity will further decrease. That is, if the positive electrode is discharged only from 4.0 V to 3.0 V even if it is possible to be discharged from 4.0 V to 2.0 V, only half of the capacity is utilized, and the capacitor can not have a large capacity although it have a high voltage. In order to achieve not only a high voltage and a high energy density but also a large capacity and further a high energy density of a hybrid capacitor, it is required to improve the utilization of the positive electrode capacity.

That is, when the positive electrode potential after the short-circuit is lower than 3.0 V, the utilization of the capacity will increase correspondingly, and a large capacity will be achieved. In order that the positive electrode potential will be 2.0 V or less, it is preferable to dope the negative electrode with lithium ions not only in an amount of lithium ions to be doped by the charge and discharge of the cell but also separately from a lithium ion supply source such as lithium metal. As the lithium ions are supplied other than from the positive electrode and the negative electrode, potentials of the positive electrode, the negative electrode and lithium metal are in equilibrium and 3.0 V or less when the positive and negative electrodes are short-circuited. The larger the amount of lithium metal, the lower the equilibrium potential. As the equilibrium potential changes depending upon the negative electrode material and the positive electrode material, it is required to adjust the amount of lithium ions to be doped into the negative electrode considering characteristics of the negative electrode material and the positive electrode material so that the positive electrode potential after short-circuit will be 2.0 V or less.

In the LIC of the present invention, the positive electrode potential being 2.0 V or less after the positive electrode and the negative electrode are short-circuited means that lithium ions are supplied to the positive electrode and/or the negative electrode other than from the positive electrode and the negative electrode of the LIC as mentioned above. The lithium ions can be supplied to one of or both the negative electrode and the positive electrode. However, in a case where an activated carbon is used for the positive electrode for example, if the amount of lithium ions doped is large and the positive electrode potential is low, lithium ions can be irreversibly consumed, and drawbacks such as a decrease in the capacity of the cell can occur in some cases. Thus, it is required to suitably control the amount of lithium ions to be supplied to the negative electrode and the positive electrode so that there will be no drawbacks. In either case, since the lithium ions supplied preliminarily to the positive electrode and/or the negative electrode by the electrochemical contact of the positive electrode and/or the negative electrode are supplied to the negative electrode by the charge of the cell, the negative electrode potential becomes lower.

Further, in a case where the positive electrode potential is higher than 2.0 V after the positive electrode and the negative electrode are short-circuited, as the amount of lithium ions supplied to the positive electrode and/or the negative electrode is small, the energy density of the cell is low. The larger the amount of lithium ions supplied is, the lower the positive electrode potential becomes after the positive electrode and the negative electrode are short-circuited and the more the energy density will be improved. In order to obtain a high energy density, 2.0 V or less is preferred, and in order to obtain a further higher energy density, 1.0 V or less (vs. Li/Li$^+$) is preferred. In other words, the positive electrode potential becoming lower after the positive electrode and negative electrode are short-circuited means that the amount of lithium ions supplied to the negative electrode by the charge of the cell becomes greater. As the capacitance of the negative electrode increases, a change in the negative electrode potential decreases. As a result, the change in the positive electrode potential increases, and the capacitance and capacity of the cell increases, whereby a high energy density can be obtained.

If the positive electrode potential is lower than 1.0 V, drawbacks such as evolution of gas or irreversible consumption of lithium ions can occur depending upon the positive electrode active material, and it is difficult to measure the positive electrode potential. Further, a too low positive electrode potential means an excessive weight of the negative electrode, and the energy density will rather decrease. Therefore, the positive electrode potential is usually 0.1 V or more, preferably 0.3 V or more.

In the present invention, the capacitance and the capacity are defined as follows. The capacitance of a cell represents the slope of a discharge curve of a cell and its unit is F (farad). The capacitance per unit weight of a cell is a value obtained by dividing the capacitance of a cell by the total weight of the positive electrode active material and the negative electrode active material put in a cell and its unit is F/g. The capacitance of a positive electrode represents the slope of a discharge curve of a positive electrode and its unit is F. The capacitance per unit weight of a positive electrode is a value obtained by dividing the capacitance of a positive electrode by the weight of a positive electrode active material put in a cell and its unit is F/g. The capacitance of a negative electrode represents the slope of a discharge curve of a negative electrode and its unit is F. The capacitance per unit weight of a negative electrode is a value obtained by dividing the capacitance of a negative electrode by the weight of a negative electrode active material put in a cell and its unit is F/g.

Further, the cell capacity is a product of the capacitance of a cell and a difference between the discharge start voltage and the discharge end voltage of a cell, i.e., a change in voltage, and its unit is C (coulomb) Here, 1 C is charge quantity when 1 A current flows in one second, and thus the unit is calculated as mAh in the present invention. The positive electrode capacity is a product of the capacitance of the positive electrode and a difference (a change in the positive electrode potential) in the positive electrode potential between the discharge start and the discharge end potential, and its unit is C or mAh. Similarly, the negative electrode capacity is a product of the capacitance of the negative electrode, and a difference (a change in the negative electrode potential) in the negative electrode potential between the discharge start and the discharge end potential, and its unit is C or mAh. The cell capacity agrees with the positive electrode capacity and the negative electrode capacity.

Now, chief components constituting the lithium ion capacitor according to the typical example of the present invention will be explained sequentially below. For the positive electrode current collector and the negative electrode current collector of the present invention, various materials proposed for use in an organic electrolyte battery or the like can be usually used. For the positive electrode current collector, aluminum, stainless steel, and so forth can be suitably used, and for the negative electrode current collector, stainless steel, copper, nickel, and so forth can be suitably used. Further, various shapes such as a foil and a net can be employed. Particularly, in order that lithium ions are preliminarily doped into the negative electrode and/or the positive electrode, preferred is one having holes penetrating from the front surface to the back surface, such as an expanded metal, a perforated metal, a metal net, a foam or a porous foil having through holes imparted by etching. The through holes of the electrode current collector can be suitably set to round, square, or the other shape.

More preferably, before formation of an electrode, at least some of the through holes on the electrode current collector are filled with an conductive material which is less likely to come off, and each of a positive electrode and a negative electrode is formed thereon, whereby productivity of the electrode will improve and further, a problem of a decrease in reliability of a capacitor by detachment of the electrode will be solved. Further, the electrode including the current collector can be made thin, whereby a high energy density and a high power density will be realized.

The shape, number, and the like of the through holes of the electrode current collector can suitably be set so that lithium ions in an electrolytic solution as described hereinafter can move from the front surface to the back surface of the electrode without being blocked by the electrode current collector, and that the holes can easily be filled with the conductive material.

The aperture ratio of the electrode current collector is defined by calculating the ratio {1-(weight of the current collector/true specific gravity of the current collector)/(apparent volume of the current collector)} as percentage. The aperture ratio of the electrode current collector to be used in the typical example of the present invention is usually from 10 to 79%, preferably from 20 to 60%. It is desirable to suitably select the aperture ratio and the hole size of the electrode current collector from the above range considering the structure and the productivity of the cell.

The above negative electrode active material is not particularly limited so long as it can reversibly dope lithium ions, and it can, for example, be graphite, hard carbon or a polyacene type organic semiconductor (PAS) which is a heat-treated aromatic condensed polymer having a polyacene skeleton structure with an atomic ratio (hereinafter, referred to as H/C) of hydrogen atoms/carbon atoms from 0.50 to 0.05. Among them, PAS is more preferred with a view to obtaining a large capacity. A capacitance of 650 F/g or more will be obtained when lithium ions in an amount of 400 mAh/g are doped (charged) to PAS having a H/C ratio of about 0.2, followed by discharging, and a capacitance of 750 F/g or more will be obtained when lithium ions in an amount of 500 mAh/g or more are doped. Thus, it is understood that PAS has a very large capacitance.

In the preferred embodiment of the present invention, in a case where an active material having an amorphous structure such as PAS is used for the negative electrode, the larger the amount of lithium ions to be doped, the lower the potential is. Thus, the withstand voltage (charging voltage) of an electrical storage device to be obtained increases, and the voltage-increasing rate (the slope of the discharge curve) in discharging is low. Therefore, it is desirable to suitably set the amount of lithium ions within the lithium ion absorbing ability of the active material depending upon the desired working voltage of the electrical storage device.

Further, PAS, which has an amorphous structure, is free from structural changes such as swelling and contraction due to doping and undoping of lithium ions and is thereby excellent in cyclic characteristics. Further, it has an isotropic molecular structure (a higher-order structure) for doping and undoping of lithium ions and thereby has excellent characteristics in quick charging and quick discharging, and accordingly it is suitable as a negative electrode material.

An aromatic condensation polymer which is a precursor of PAS is a condensed product of an aromatic hydrocarbon compound with an aldehyde. The aromatic hydrocarbon compound can be suitably a so-called phenol group such as phenol, cresol, and xylenol. For example, the aromatic hydrocarbon compound can be a methylene-bisphenol represented by the following formula, a hydroxy-bisphenyl or a hydroxynaphthalene.

[Chemical Formula 1]

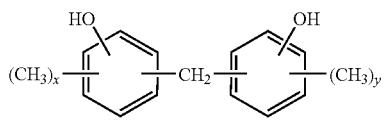

In the formula, x and y are independently from each other, in a range of 0, 1 or 2. Among them, a phenol, particularly phenol is the most preferable from a viewpoint of practical use.

Further, the aromatic condensation polymer can also be a modified aromatic condensation polymer having part of the above aromatic hydrocarbon compound having a phenolic hydroxyl group substituted by an aromatic hydrocarbon compound having no phenolic hydroxyl group such as xylene, toluene or aniline, for example, a condensed product of phenol, xylene and formaldehyde. Further, a modified aromatic polymer substituted by melamine or urea can also be used, and a furan resin is also suitable.

In the typical example of the present invention, PAS is used as an insoluble and infusible substrate, and the insoluble and infusible substrate can be produced, for example, from the above aromatic condensation polymer as follows. Namely, the aromatic condensed polymer is gradually heated to an appropriate temperature of 400 to 800° C. in a non-oxidizing atmosphere (including vacuum) to obtain an insoluble and infusible substrate having an H/C of 0.5 to 0.05, preferably of 0.35 to 0.10.

However, the method of producing the insoluble and infusible substrate is not limited to this method, and it is possible to obtain an insoluble and infusible substrate having the above H/C and having a specific surface area of at least 600 m$^2$/g as measured by BET method using a method as disclosed in JP-B-3-24024, for example.

With respect to the insoluble and infusible substrate to be used in the typical example of the present invention, from X-ray diffraction (CuKα), the main peak is present at the position of 24° or less as represented by 2θ, and another broad peak is present at a position of between 41° and 46° in addition to the above main peak. Namely, the insoluble and infusible substrate has a polyacene skeleton structure having an aromatic polycyclic structure appropriately developed, has an amorphous structure, and is capable of being stably doped with lithium ions, and is thereby suitable as an active material for a lithium ion storage device.

In the typical example of the present invention, the negative electrode active material is preferably one having a pore diameter of at least 3 nm and a pore volume of at least 0.10 mL/g, and the upper limit of the pore diameter is not limited but is usually from 3 to 50 nm. Further, the range of the pore volume is also not particularly limited, but is usually from 0.10 to 0.5 mL/g, preferably from 0.15 to 0.5 mL/g.

In the typical example of the present invention, the negative electrode is formed on a negative electrode current collector from a powder of a negative electrode active material such as the above carbon material or PAS, and its method is not particularly limited and a known method can be used. Specifically, it can be formed by dispersing the negative electrode active material powder, a binder and if necessary, a conductive powder in an aqueous or organic solvent to obtain a slurry, and applying the slurry on the current collector or preliminarily forming the slurry into a sheet, and bonding the sheet on the current collector. The binder to be used can, for example, be a rubber type binder such as SBR, a fluororesin such as polytetrafluoroethylene or polyvinylidene fluoride, or a thermoplastic resin such as a polypropylene or a polyethylene. Among them, a fluorinated binder is preferred, a fluorinated binder having an atomic ratio of fluorine atoms/carbon atoms (hereinafter referred to as F/C) of at least and less than 1.5, is more preferred, and a fluorinated binder having an F/C of at least 0.75 and less than 1.3, is furthermore preferred. The amount of the binder to be used varies depending upon the type of the negative electrode active material, the electrode shape, and the like, but it is from 1 to 20 wt %, preferably from 2 to 10 wt %, for the negative electrode active material.

Further, the conductive material to be used if necessary can, for example, be acetylene black, graphite or a metal powder. The amount of the conductive material to be used varies depending upon the conductivity of the negative electrode active material, the electrode shape, and the like, but 2 to 40 wt % for the negative electrode active material is suitable.

Although the thickness of the negative electrode active material is set in balance with the thickness of the positive electrode active material so as to secure the energy density of the cell, considering the output density and the energy density of the cell, industrial productivity, and the like, the thickness is usually 15 to 100 μm, preferably 20 to 80 μm, on one side of a current collector.

In the LIC of the typical example of the present invention, the positive electrode contains a positive electrode active material such as tetrafluoroborate capable of reversibly doping lithium ions and/or anions.

The positive electrode active material is not particularly limited so long as it can reversibly dope lithium ions and/or anions, and it can, for example, be an activated carbon, an conductive polymer, or a polyacene organic semiconductor (PAS) which is a heat-treated aromatic condensed polymer having a polyacene skeleton structure with an H/C of 0.05 to 0.50.

A method of forming a positive electrode on a positive electrode current collector by using the above positive electrode active material is substantially the same as the case of the above negative electrode, and its detailed description is omitted.

Further, in the LIC according to the typical example of the present invention, it is preferred that the capacitance per unit weight of the negative electrode active material is three times or more the capacitance per unit weight of the positive electrode active material and that the weight of the positive electrode active material is larger than the weight of the negative electrode active material. By properly controlling the amount of lithium ions filling the negative electrode (pre-doping amount) considering the capacitance of the positive electrode to be used, it is possible that the capacitance of three times or more the capacitance per positive electrode unit weight is secured, and that the positive electrode active material weight can be made larger than the negative electrode active material weight. In such a manner, a capacitor having a higher voltage and a larger capacity as compared with a conventional electric double layer capacitor will be obtained. Further, in a case where a negative electrode having a capacitance per unit weight larger than the capacitance per unit weight of the positive electrode is used, it becomes possible to reduce the negative electrode active material weight without changing the change in potential of the negative electrode, whereby the filling amount of the positive electrode-active material increases, whereby the capacitance and the capacity of the cell can be increased. The positive electrode active material weight is preferably larger than the negative electrode active material weight, and it is more preferably from 1.1 times to 10 times. If it is less than 1.1 times, the difference in capacity is small, and if it exceeds 10 times, the capacity can be small on the contrary in some cases, and the difference in thickness between the positive electrode and the negative electrode will be too significant and such is unfavorable in view of the cell structure.

As an electrolyte to be used in the LIC according to the typical example of the present invention, an electrolyte capable of transferring lithium ions is used. Such an electrolyte is preferably one which is usually a liquid and which can infiltrate into a separator. As a solvent for such an electrolyte, preferred is an aprotic organic solvent capable of forming an aprotic organic solvent electrolytic solution. The aprotic organic solvent can, for example, be ethylene carbonate, propylene carbonate, dimethyl carbonate, diethyl carbonate, γ-butyrolactone, acetonitrile, dimethoxyethane, tetrahydrofuran, dioxolane, methylene chloride or sulfolane. Further, a liquid mixture having two or more of such aprotic organic solvents mixed can also be used.

Further, an electrolyte to be dissolved in such a solvent can be one which is capable of transferring lithium ions and which will not cause electrolysis even at a high voltage, and in which lithium ions can be stably present. Such an electrolyte can, for example, be preferably a lithium salt such as $LiClO_4$, $LiAsF_6$, $LiBF_4$, $LiPF_6$ or $LiN(C_2F_5SO_2)_2$.

The above electrolyte and solvent are mixed in a sufficiently dehydrated state to obtain an electrolytic solution. The concentration of the electrolyte in the electrolytic solution is preferably 0.1 mol/L or more so as to reduce the internal resistance due to the electrolytic solution, more preferably within a range from 0.5 to 1.5 mol/L.

Further, as a separator, a porous member having durability against the electrolytic solution, the electrode active material, and the like, having through holes and having no conductivity can be used. In the present invention, the separator disposed between the electrodes constituting the electrode laminate unit can be formed of substantially the same material as the separator to be pressure-bonded to the lithium metal foil. The material of the separator can, for example, be a resin such as a cellulose (paper), a polyethylene or a polypropylene, and a known one can be used. Among them, a cellulose (paper) is excellent in view of durability and economical efficiency. As the form of use, a paper or resin nonwoven fabric is preferred as described above. The thickness of the separator is not limited but is usually preferably about 20 to about 50 µm.

As the lithium metal used as a lithium ion supply source so that lithium ions are preliminarily doped to the negative electrode and/or the positive electrode, a material containing at least lithium element and capable of supplying lithium ions is used, such as lithium metal or a lithium/aluminum alloy. In such a case, preferably, in the inside of the capacitor and so forth, an amount of the lithium metal foil is disposed, the amount with which a predetermined amount of lithium ions is doped to the negative electrode and/or positive electrode. Further, it is preferred to form the current collector attached into the lithium metal foil using a conductive porous member. Specifically, the conductive porous member is preferably a metal porous member which will not react with the lithium metal, such as a stainless steel mesh.

The material of the outer container in the typical example of the present invention is not particularly limited, and various materials commonly used for batteries and capacitors can be used. For example, a metal material such as iron or aluminum, a plastic material or a composite material including a laminate thereof can be used. Further, the shape of the outer container is not particularly limited but in view of reduction in size and weight of the capacitor and so forth, preferred is an outer container in the form of a film using a laminate film of aluminum with a polymer material such as nylon or polypropylene.

In the lithium ion capacitor according to the preferred example of the present invention, an active material capable of reversibly doping lithium ions and/or anions is used for the positive electrode, an aprotic organic solvent solution of a lithium salt is used for the electrolyte, the negative electrode active material has a capacitance of at least three times the capacitance per unit weight of the positive electrode active material, the positive electrode active material weight is larger than the negative electrode active material weight, a lithium metal foil preliminarily attached with the support member is disposed within the cell to short-circuit the negative electrode, whereby the negative electrode can be preliminarily doped with a predetermined amount of lithium ions.

Further, by using a negative electrode having a large capacitance per unit weight relative to the capacitance per unit weight of the positive electrode, it becomes possible to reduce the negative electrode active material weight without any change in potential of the negative electrode, whereby the amount of the positive electrode active material to be filled will be large, and the capacitance and the capacity of the cell will be large. Further, as the capacitance of the negative electrode is large, the change in potential of the negative electrode becomes small, and as a result, the change in potential of the positive electrode becomes large, and the capacitance and the capacity of the cell become large.

Further, in a conventional electric double layer capacitor, the positive electrode potential will lower only to about 3 V at the time of discharging, but in the lithium ion capacitor according to the typical example of the present invention, the positive electrode potential will be lowered to 3 V or below as the negative electrode potential is low, whereby a larger capacity as compared with a conventional electric double layer capacitor will be achieved.

Still further, by preliminarily doping the negative electrode with lithium ions in a predetermined amount so as to obtain a required capacity as a negative electrode capacity, the working voltage can be set to be 3 V or higher, and the energy density will improve, as compared with the working voltage of a conventional capacitor of from about 2.3 to about 2.7 V.

Hereinabove, the lithium metal foil has been illustrated and described with regard to a lithium ion capacitor; however, the lithium metal foil, in which a separator or a current collector is preliminarily attached to a single surface or both surfaces of the lithium metal foil, can be similarly used as a lithium ion supply source of a lithium ion battery. Now, the present invention will be explained in detail with reference to specific examples.

Example 1

A polyethylene nonwoven fabric having a thickness of 100 μm and width of 6.5 cm is overlapped on both surfaces of a lithium metal foil having a thickness of 150 μm and a width of 6.0 cm and pressed by rolls made from Delrin™, whereby a nonwoven fabric attached lithium metal foil 1 is obtained. The length of the nonwoven fabric attached lithium metal foil 1 is 100 cm.

The nonwoven fabric attached lithium metal foil 1 is then cut at intervals of 10 cm using a commercially available guillotine paper cutter, whereby 10 sheets of a strip-shaped nonwoven fabric attached lithium metal foil are obtained with no special difficulties.

Comparative Example 1

A lithium metal foil having a thickness of 150 μm and a width of 6.0 cm is cut at intervals of 10 cm using a commercially available guillotine paper cutter in the same manner as in Example 1. However, it is difficult to cut into a precise size since a lithium metal adhered to a cutting blade of the cutter whenever one sheet is cut. Further, since a subsequent cutting could not be performed unless the lithium metal adhering to the cutting blade whenever one sheet is cut is wiped out, the operation required much time.

Comparative Example 2

A polyethylene microporous film having a thickness of 50 μm and width of 6.5 cm is overlapped on both surfaces of a lithium metal foil, in the same manner as in Example 1 except that the polyethylene microporous resin films are used instead of the polyethylene nonwoven fabrics having a thickness of 100 μm and width of 6.5 cm, and pressed by rolls made from Delrin™. However, the lithium metal foil and the polyethylene microporous films are not attached but separated from each other.

The polyethylene microporous film is overlapped on both surfaces of the separated lithium metal foil and then cut at intervals of 10 cm using a commercially available guillotine paper cutter, whereby 10 sheets of a strip-shaped lithium metal foil are obtained with no lithium metal adhering to the cutting blade of the cutter. However, the cutting is difficult to perform because the lithium metal is misaligned with the polyethylene microporous films as they are not attached with each other.

Example 2

A separator made of paper having a thickness of 50 μm and width of 6.5 cm is overlapped on both surfaces of a lithium metal foil, in the same manner as in Example 1 except that the paper is used instead of the polyethylene nonwoven fabrics having a thickness of 100 μm and width of 6.5 cm, and pressed by rolls made from Delrin™, whereby a nonwoven fabric integrated lithium metal foil 2 is obtained. The length of the nonwoven fabric integrated lithium metal foil 2 is 100 cm.

The nonwoven fabric integrated lithium metal foil 2 is then cut at intervals of 10 cm using a commercially available guillotine paper cutter, whereby 10 sheets of a strip-shaped nonwoven fabric integrated lithium metal foil are obtained with no special difficulties.

As can be seen from Examples and Comparative Examples, since the lithium metal foil adheres firmly to a metal, it is difficult to cut the lithium metal foil using a metallic cutting blade; however, when the lithium metal foil is sandwiched between paper or resin nonwoven fabrics; the lithium metal foil can be cut with no special difficulties. However, since the lithium metal foil can not be attached with the polyethylene microporous films, it is difficult to efficiently perform the cutting. Since the paper or resin nonwoven fabric can be attached to the lithium metal foil, it can be said that it is an industrially preferable method, which provides high workability.

Example 3

A polyethylene nonwoven fabric having a thickness of 100 μm and width of 6.5 cm is overlapped on a single surface of a lithium metal foil having a thickness of 150 μm and a width of 6.0 cm and pressed by rolls made from Delrin™, whereby a nonwoven fabric attached lithium metal foil 3 is obtained. The length of the nonwoven fabric attached lithium metal foil 3 is 100 cm.

The nonwoven fabric attached lithium metal foil 3 is then cut at intervals of 10 cm using a commercially available guillotine paper cutter, whereby 10 sheets of a strip-shaped nonwoven fabric attached lithium metal foil are obtained in about the same as in Example 1 although some lithium metal is adhered to the cutting blade of the cutter.

Example 4

An expanded metal made of copper (manufactured by Nippon Metal Industry Co. Ltd.) having a thickness of 32 μm and a width of 6.5 cm (aperture ratio: 50%) is overlapped on a single surface of a lithium metal foil having a thickness of 150 μm and a width of 6.0 cm and pressed by rolls made from Delrin™, whereby a porous metal foil attached lithium metal foil 4 is obtained. The length of the porous metal foil attached lithium metal foil 4 is 100 cm. Subsequently, a polyethylene nonwoven fabric having a thickness of 100 μm and a width of 6.5 cm is overlapped on the surface of the lithium metal foil of the porous metal foil attached lithium metal foil 1 and pressed by rolls made from Delrin™, whereby a nonwoven fabric attached lithium metal foil 5 is obtained.

The nonwoven fabric attached lithium metal foil 5 is then cut at intervals of 10 cm using a commercially available guillotine paper cutter, whereby 10 sheets of a strip-shaped nonwoven fabric attached lithium metal foil are obtained in about the same time as in Example 1 with no special difficulties.

In this way, it is known that even when a porous metal foil is attached to the lithium metal foil, by attaching a resin nonwoven fabric, the cutting can be performed with no special difficulties.

Example 5

Manufacturing Method of Negative Electrode 1

A phenol resin molded plate having a thickness of 0.5 mm is put in a Siliconit electric furnace and subjected to a heat treatment by increasing the temperature at a rate of 50° C./hour to 500° C. and further at a rate of 10° C./hour to 660° C. in a nitrogen atmosphere thereby to synthesize PAS. The PAS plate thus obtained is pulverized with a disk mill to obtain a PAS powder. The PAS powder had an H/C ratio of 0.21.

Then, 100 parts by weight of the above PAS powder and a solution in which 10 parts by weight of a polyvinylidene fluoride powder is dissolved in 80 parts by weight of N-methylpyrrolidone are sufficiently mixed to obtain a slurry. This slurry is applied on one surface of a copper foil having a thickness of 18 μm in an amount of about 7 mg/cm$^2$ as a solid content, dried and pressed to obtain a PAS negative electrode 1.

(Measurement of Capacitance Per Unit Weight of Negative Electrode 1)

The negative electrode is cut into four negative electrodes having a size of 1.5×2.0 cm$^2$ for evaluation. Each of the negative electrodes and lithium metal having a size of 1.5×2.0 cm$^2$ and a thickness of 200 μm as a counter electrode are laminated with a polyethylene nonwoven fabric having a thickness of 50 μm as a separator interposed therebetween to assemble a simulation cell. Lithium metal is used as a reference electrode. As an electrolytic solution, a solution having LiPF$_6$ dissolved at a concentration of 1 mol/L in propylene carbonate is used.

Subsequently, 400 mAh/g of lithium ions on the basis of the weight of the negative electrode active material are doped at a charging current of 1 mA in one cell, and then the cell is discharged to 1.5 V at 1 mA. The capacitance per unit weight of the negative electrode 1 is found to be 661 F/g from a discharging time needed for a change of 0.2 V in potential from the potential of the negative electrode one minute later after the discharge is started.

(Manufacturing Method of Positive Electrode 1)

100 parts by weight of a commercially available activated carbon powder having a specific surface area of 1950 m$^2$/g and a solution in which 10 parts by weight of a polyvinylidene fluoride powder is dissolved in 100 parts by weight of N-methylpyrrolidone are sufficiently mixed to obtain a slurry. This slurry is applied on one surface of an aluminum foil having a thickness of 20 μm coated with a carbon type conducted coating, in an amount of about 7 mg/cm$^2$ as a solid content, dried and pressed to obtain a positive electrode 1.

(Measurement of Capacitance Per Unit Weight of Positive Electrode 1)

The above positive electrode 1 is cut into a positive electrode having a size of 1.5×2.0 cm$^2$ for evaluation. The positive electrode and a lithium metal having a size of 1.5×2.0 cm$^2$ and a thickness of 200 μm as a counter electrode are laminated with a polyethylene nonwoven fabric having a thickness of 50 μm as a separator interposed therebetween to assemble a simulation cell. Lithium metal is used as a reference electrode. As an electrolytic solution, a solution having LiPF$_6$ dissolved at a concentration of 1 mol/L in propylene carbonate is used.

Charge to 3.6 V at a charge current of 1 mA is carried out and then constant voltage charge is carried out, and after a total charge time of 1 hour, discharge is carried out to 2.5 V at 1 mA. The capacitance per unit weight of the positive electrode 1 is obtained from the discharge time from 3.5 V to 2.5 V and found to be 92 F/g.

(Manufacturing Method of Negative Electrode 2)

The above slurry for the negative electrode 1 is applied on both sides of copper expanded metal (manufactured by Nippon Metal Industry, Co., Ltd.) having a thickness of 32 μm (aperture ratio 50%) by a die coater, followed by pressing to obtain a negative electrode 2 having an entire thickness (the total of the thickness of the negative electrode layers on both sides and the thickness of the negative electrode current collector) of 148 μm.

(Manufacturing Method of Positive Electrode 2)

A non-aqueous carbon type conductive coating (manufactured by Acheson (Japan) Limited, EB-815) is applied to both sides of aluminum expanded metal (manufactured by Nippon Metal Industry, Co., Ltd.) having a thickness of 35 μm (aperture ratio 50%) by spraying method and dried to obtain a current collector for a positive electrode having conductive layers formed thereon. The entire thickness (the total of the thickness of the current collector and the thickness of the conductive layer) is 52 μm, and through holes are substantially filled with the conductive coating. The above slurry for the positive electrode 1 is applied on both sides of the positive electrode current collector by a roll coater, followed by pressing to obtain a positive electrode 2 having an entire thickness (the total of the thickness of the positive electrode layers on both sides, the thickness of the conductive layers on both sides and the thickness of the positive electrode current collector) of 312 μm.

(Fabrication of Electrode Laminate Unit 1)

The negative electrode 2 having a thickness of 148 μm is cut into pieces having a size of 6.0×7.5 cm$^2$ (excluding the terminal welding portion), the positive electrode 2 having a thickness of 312 μm is cut into pieces having a size of 5.8×7.3 cm$^2$ (excluding the terminal welding portion), and they are laminated by using as a separator a cellulose/rayon mixed nonwoven fabric having a thickness of 35 μm so that the terminal welding portions of the positive electrode current collectors and the negative electrode current collectors are opposite to each other, that the positive electrodes and the negative electrodes faced at 20 faces, and that the electrodes at the outermost portion of the laminated electrodes is a negative electrode. A separator is disposed at each of the outermost and lowermost portions, and four sides are fixed with a tape Then, the terminal welding portions (10 sheets) of the positive electrode current collectors and the terminal welding portions (11 sheets) of the negative electrode current collectors are welded to aluminum positive electrode terminals and copper negative electrode terminals each having a width of 50 mm, a length of 50 mm and a thickness of 0.2 mm by ultrasonic welding to obtain an electrode laminate unit 1. On that occasion, 10 sheets of the positive electrode and 11 sheets of the negative electrode are used. Although the weight of the positive electrode active material is 1.3 times the weight of the negative electrode active material, it is 1.4 times the weight of the negative electrode active material contained in the area of the negative electrode opposite the positive electrode. The area of the positive electrode is 94% of the area of the negative electrode.

(Fabrication of Cell 1)

An expanded metal made of copper (manufactured by Nippon Metal Industry Co. Ltd.) having a thickness of 32 μm and a width of 9.0 cm (aperture ratio: 50%) is laminated on a single surface of a lithium metal foil having a thickness of 82 μm and a width of 7.5 cm and pressed by rolls made from Delrin™, whereby a porous metal foil attached lithium metal foil 2 is obtained. The length of the porous metal foil attached lithium metal foil 2 is 50 cm. Subsequently, a polyethylene nonwoven fabric having a thickness of 100 μm and a width of 6.5 cm is laminated on the surface of the lithium metal foil of the porous metal foil attached lithium metal foil 2 and pressed by rolls made from Delrin™, whereby a nonwoven fabric attached lithium metal foil 5 is obtained.

The nonwoven fabric attached lithium metal foil 5 is then cut at intervals of 6 cm using a commercially available guillotine paper cutter, whereby 6 sheets of the nonwoven fabric attached lithium metal foil are obtained and used as a lithium electrode 1. The lithium electrode 1 is disposed at the upper and lower portions of the electrode laminate unit 1 so that each outermost negative electrode is faced the polyethylene nonwoven fabric of the lithium electrode, thereby a three electrode laminate unit is obtained. The terminal welding portions (2 sheets) of the current collectors of the lithium electrode 1 are welded to the negative electrode terminal welded portion by resistance welding. Then, the three electrode laminate unit is put in the inside of an outer film deep drawn to 6.5 mm and covered with an outer laminated film, and three sides are fused. Then, the unit is vacuum impregnated with a solution in which $LiPF_6$ is dissolved at a concentration of 1 mol/L in a solvent mixture of ethylene carbonate, diethyl carbonate and propylene carbonate in a weight ratio of 3:4:1 as an electrolytic solution, and the remaining one side is fused, whereby three cells of film type lithium ion capacitors are assembled. The lithium metal disposed in the cell corresponded to 400 mAh/g per negative electrode active material weight.

(Initial Evaluation of Cell)

Days after the cells are left to stand after assembled, one cell is decomposed, whereupon the lithium metal completely disappeared. Accordingly, it is judged that the doping with lithium ions is possible with respect to the negative electrode active material even when using the lithium electrode attached to the polyethylene nonwoven fabric and that the negative electrodes are preliminarily doped with lithium ions so as to obtain a capacitance of at least 660 F/g per unit weight of the negative electrode active material. The capacitance of the negative electrode is 7.2 times the capacitance of the positive electrode.

(Evaluation of Characteristic of Cell)

A constant current/constant voltage charge is carried out for 1 hour, including charge at a constant current of 2000 MA until the cell voltage became 3.6 V and then application of a constant voltage at 3.6 V. Then, discharge is carried out at a constant current of 200 mA until the cell voltage became 1.9 V. This cycle of from 3.6 V to 1.9 V is repeatedly carried out, and the cell capacity and the energy density are evaluated at the tenth discharge. The results are shown in Table 1. The data are averages of two cells.

TABLE 1

| | Capacity (mAh) | Energy Density (Wh/l) |
|---|---|---|
| Example 5 | 183 | 11.5 |

After completion of the above measurement, the positive electrodes and the negative electrodes of one cell are short-circuited and the potential of the positive electrode is measured, whereupon it is about 0.95 V, which is 2.0 V or less. A capacitor having a high energy density is obtained by preliminarily doping the negative electrodes and/or the positive electrodes with lithium ions so that the positive electrode potential would be 2.0 V or less when the positive electrodes and the negative electrodes are short-circuited. Further, it is possible to shorten the fabrication time of a test cell since the cutting time of the lithium metal is shortened by using the lithium electrode attached to the polyethylene nonwoven fabric.

Example 6

Fabrication of Electrode Winding Unit 2

The negative electrode 2 having a thickness of 148 μm is cut into a shape having a width of 3.0 cm and a length of 36.5 cm so as to include a non-coated portion at a position of 10 mm from the end, and an electrode made of copper is placed on a current collector of the non-coated portion, whereby the electrode is connected to the negative electrode current collector by stitching. Subsequently, the positive electrode 2 having a thickness of 312 μm is cut into a shape having a width of 3.0 cm and a length of 34.5 cm so as to include a non-coated portion at a position of 10 mm from the end, and an electrode made of aluminum is placed on a current collector of the non-coated portion, whereby the electrode is connected to the positive electrode current collector by stitching.

Using, as a separator, two sheets of a cellulose/rayon mixed nonwoven fabric having a thickness of 35 μm and a width of 3.5 cm, they are laminated such that the positive electrode and the negative electrode are not contacted. On that occasion, a lithium metal foil having a thickness of 120 μm and a width of 5.3 cm is pressure-bonded to one sheet so that the lithium metal foil is disposed so as to face the negative electrode. However, the lithium metal foil is disposed so as not to overlap with the negative electrode terminal.

Subsequently, the bonded material is wound so that the terminals of the positive electrode and the negative electrode are on the same side. Since the lithium metal foil is firmly pressure-bonded to the cellulose/rayon mixed nonwoven fabric, it is possible to perform the winding without any problems such as winding misalignment. Thereafter, the outermost portion is fixed with a tape and three electrode winding units 2 are fabricated.

(Fabrication of Cell 2)

The electrode winding unit 1 is inserted in the inside of an outer can made of aluminum having an outer diameter of 18 mm and a height of 40 mm. Then, the unit is vacuum impregnated with a solution in which $LiPF_6$ is dissolved at a concentration of 1 mol/L in a solvent mixture of ethylene carbonate, diethyl carbonate and propylene carbonate in a weight ratio of 3:4:1 as an electrolytic solution, and the outer can is caulked with a cap made of butyl rubber, whereby three cylindrical lithium ion capacitor cells 2 are assembled. The lithium metal disposed in the cell corresponded to 400 mAh/g per negative electrode active material weight.

(Initial Evaluation of Cell)

Days after the cells are left to stand after assembled, one cell is decomposed, whereupon the lithium metal completely disappeared. Accordingly, it is judged that the doping of the negative electrode with lithium ions is possible by pressure-bonding the lithium metal foil to the separator so as to contact the surface of the negative electrode and that the negative electrodes are preliminarily doped with lithium ions so as to obtain a capacitance of at least 660 F/g per unit weight of the negative electrode active material. The capacitance of the negative electrode is 7.2 times the capacitance of the positive electrode.

(Evaluation of Characteristic of Cell)

A constant current/constant voltage charge is carried out for 1 hour, including charge at a constant current of 300 mA until the cell voltage became 3.6 V and then application of a constant voltage at 3.6 V. Then, discharge is carried out at a constant current of 30 mA until the cell voltage became 1.9 V. This cycle of from 3.6 V to 1.9 V is repeatedly carried out, and the cell capacity and the energy density are evaluated at the tenth discharge. The results are shown in Table 2. The data are averages of two cells.

TABLE 2

|  | Capacity (mAh) | Energy Density (Wh/l) |
|---|---|---|
| Example 6 | 44.6 | 12.0 |

After completion of the above measurement, the positive electrodes and the negative electrodes of one cell are short-circuited and the potential of the positive electrode is measured, whereupon it is about 0.95 V, which is 2.0 V or less. A capacitor having a high energy density is obtained by preliminarily doping the negative electrodes and/or the positive electrodes with lithium ions so that the positive electrode potential would be 2.0 V or less when the positive electrodes and the negative electrodes are short-circuited. Further, by pressure-bonding the lithium metal foil at an arbitrary position on the surface of the separator facing the negative electrode, the negative electrode can be smoothly doped with lithium ions. Accordingly, by pressure-bonding the lithium metal foil to the roll-shaped separator at regular intervals, sequential winding can be carried out. In this respect, the above-described method is an industrially effective method.

Although the present invention has been illustrated and described in detail with reference to specific embodiments, it is obvious to those skilled in the art that various changes and modifications can be made to the details of the embodiments without departing from the spirit or scope of the present invention.

This application claims foreign priority based on Japanese patent application No. 2005-370698, filed on Dec. 22, 2005, the contents of which are incorporated herein by reference in its entirety.

INDUSTRIAL APPLICABILITY

The lithium ion capacitor and so forth in which the lithium metal foil for batteries or capacitors according to the present invention is used as a lithium ion supply source are quite effective as a driving storage power source or an auxiliary storage power source for an electric vehicle, a hybrid electric vehicle, and so forth. The lithium ion capacitor and so forth are also used suitably for a driving storage power source for an electric bicycle, an electric wheelchair, and so forth. Further, the lithium ion capacitor and so forth can be used suitably as various energy storage devices, such as a storage device of solar energy and a storage device for wind power generation. Alternatively, the lithium ion capacitor and so forth can be suitably used as a storage power source for household electric appliance.

The invention claimed is:

1. A method of manufacturing strip-shaped lithium metal foils for batteries or capacitors comprising:
    attaching a separator to one surface of a lithium metal foil by pressure-bonding;
    attaching a current collector to an opposite surface of the lithium metal foil by pressure-bonding, so as to form an attached lithium metal foil; wherein the attached lithium metal foil consists of the lithium metal foil, the separator, and the current collector;
    cutting the attached lithium metal foil in which the separator is attached on the one surface by pressure-bonding and the current collector is attached on the opposite surface by pressure-bonding to form the strip-shaped lithium metal foils; and
    disposing the strip-shaped lithium metal foils into cells of the batteries or capacitors.

2. The manufacturing method according to claim 1, wherein the separator and the current collector are porous materials having through-holes.

3. The manufacturing method according to claim 1, wherein the separator is a paper or resin non-woven fabric, and
    wherein the paper or resin non-woven fabric is attached to the lithium metal foil by pressure-bonding.

4. The manufacturing method according to claim 1, wherein the lithium metal foil has a thickness of 5 to 500 µm.

5. The manufacturing method according to claim 1, wherein the separator and the current collector have a thickness of 10 to 150 µm.

* * * * *